US012367031B2

(12) United States Patent
Somashekar et al.

(10) Patent No.: US 12,367,031 B2
(45) Date of Patent: Jul. 22, 2025

(54) INTELLIGENT METHOD AND SYSTEMS FOR AUTOMATED RADIO NETWORK PERFORMANCE EVALUATION OF A WIRELESS TELECOMMUNICATION NETWORK

(71) Applicant: T-Mobile USA, Inc., Bellevue, WA (US)

(72) Inventors: Sharath Somashekar, Overland Park, KS (US); Diego Estrella Chavez, Tysons, VA (US); Rashmi Kumar, Herndon, VA (US); Jennifer Feria Reyes, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 250 days.

(21) Appl. No.: 18/323,372

(22) Filed: May 24, 2023

(65) Prior Publication Data

US 2024/0394034 A1 Nov. 28, 2024

(51) Int. Cl.
*G06F 8/65* (2018.01)
*H04W 24/02* (2009.01)
*H04W 24/08* (2009.01)

(52) U.S. Cl.
CPC .............. *G06F 8/65* (2013.01); *H04W 24/02* (2013.01); *H04W 24/08* (2013.01)

(58) Field of Classification Search
None
See application file for complete search history.

(56) References Cited

U.S. PATENT DOCUMENTS

| 8,060,084 B2 | 11/2011 | Buckley et al. |
| 8,976,677 B2 | 3/2015 | Novak et al. |

(Continued)

FOREIGN PATENT DOCUMENTS

| CN | 105340327 A | 2/2016 |
| CN | 105659657 B | 3/2019 |

(Continued)

OTHER PUBLICATIONS

D'Oro et al., "OrchestRAN: Network Automation through Orchestrated Intelligence in the Open RAN," IEEE, 2022, 10pg. (Year: 2022).*

(Continued)

*Primary Examiner* — Ryan D. Coyer
(74) *Attorney, Agent, or Firm* — Perkins Coie LLP

(57) ABSTRACT

The system scans a RAN associated with a wireless telecommunication network to obtain an indication of a hardware status and a software status associated with the RAN. The system determines whether there is an update to the hardware or software status associated with the RAN. Upon determining there is the update, the system obtains from a first database an indication of a remote radio head configured to test the update. Based on the indication of the remote radio head, the system obtains from a second database multiple UEs configured to test the update. The system tests the update by causing the remote radio head to send a communication to a UE among the multiple UEs. The system obtains logs associated with the communication and, based on the logs, determines whether the update passes the tests.

20 Claims, 8 Drawing Sheets

(56) References Cited

U.S. PATENT DOCUMENTS

| | | | |
|---|---|---|---|
| 9,814,021 B2 | 11/2017 | Himayat et al. | |
| 9,872,197 B2 | 1/2018 | Himayat et al. | |
| 9,900,845 B2 | 2/2018 | Cui et al. | |
| 9,918,267 B2 | 3/2018 | Plestid et al. | |
| 10,083,073 B2* | 9/2018 | Ambichl | G06F 11/0712 |
| 2013/0040634 A1 | 2/2013 | Johansson et al. | |
| 2015/0341802 A1* | 11/2015 | Chiang | H04W 24/02 |
| | | | 455/424 |
| 2022/0104050 A1 | 3/2022 | Liu et al. | |
| 2022/0167447 A1 | 5/2022 | Liu et al. | |
| 2022/0303168 A1* | 9/2022 | Mdini | H04L 41/0613 |
| 2023/0032088 A1* | 2/2023 | Goswami | G06F 8/65 |
| 2023/0153188 A1* | 5/2023 | Shrivastava | G06F 11/0721 |
| | | | 714/57 |
| 2023/0337170 A1* | 10/2023 | Stjernholm | H04W 60/06 |

FOREIGN PATENT DOCUMENTS

| | | |
|---|---|---|
| CN | 105592460 B | 7/2019 |
| CN | 110024427 A | 7/2019 |
| CN | 111903147 A | 11/2020 |
| CN | 112204914 A | 1/2021 |
| CN | 112586036 A | 3/2021 |
| CN | 113170366 A | 7/2021 |
| CN | 113475157 A | 10/2021 |
| CN | 111279749 B | 7/2022 |
| CN | 110574431 B | 11/2022 |
| EP | 2272291 A1 | 1/2011 |
| EP | 2620010 A1 | 7/2013 |
| EP | 2820883 A2 | 1/2015 |
| EP | 2989830 A1 | 3/2016 |
| EP | 3033904 A1 | 6/2016 |
| EP | 2620028 B1 | 4/2020 |
| JP | 2007529132 A | 10/2007 |
| JP | 2017225146 A | 12/2017 |
| JP | 7110187 B2 | 7/2022 |
| JP | 7237087 B2 | 3/2023 |
| KR | 20130083383 A | 7/2013 |
| KR | 20150020557 A | 2/2015 |
| KR | 20150120485 A | 10/2015 |
| KR | 101749641 B1 | 6/2017 |
| KR | 102099526 B1 | 4/2020 |
| KR | 20200139151 A | 12/2020 |
| KR | 20210014661 A | 2/2021 |
| WO | 2010048834 A1 | 5/2010 |
| WO | 2011139045 A2 | 11/2011 |
| WO | 2012037637 A1 | 3/2012 |
| WO | 2012037670 A1 | 3/2012 |
| WO | 2013020519 A1 | 2/2013 |
| WO | WO-2013125919 A1 * | 8/2013 ............ H04W 24/10 |
| WO | 2013129994 A2 | 9/2013 |
| WO | 2013140207 A1 | 9/2013 |
| WO | 2014176106 A1 | 10/2014 |
| WO | 2015023253 A1 | 2/2015 |
| WO | 2015153145 A1 | 10/2015 |
| WO | 2016146145 A1 | 9/2016 |
| WO | 2018063268 A1 | 4/2018 |
| WO | 2019195456 A1 | 10/2019 |
| WO | 2020117121 A1 | 6/2020 |
| WO | 2021020190 A1 | 2/2021 |

OTHER PUBLICATIONS

Kvalbein et al., "The Nornet Edge platform for mobile broadband measurements," Elsevier, 2012, 14pg. (Year: 2012).*

Polese et al., "Understanding O-RAN: Architecture, Interfaces, Algorithms, Security, and Research Challenges," IEEE, 2023, 36pg. (Year: 2023).*

Zhang et al., "Non-Intrusive Failure Reproduction for Distributed Systems using the Partial Trace Principle," ACM, 2017, 14pg. (Year: 2017).*

* cited by examiner

| Tech type | BAND | B2 | B4/B66 | B12 | B71 | B41 | B48 | B46 | n71 | n41 | n66 | n25 | n77 |
|---|---|---|---|---|---|---|---|---|---|---|---|---|---|
| LTE | M1 | Y | | | | | | | | | | | |
| LTE | M2 | | Y | Y | Y | | | | | | | | |
| LTE | M3 | Y | Y | | | Y | Y | | | | | | |
| LTE | M4 | Y | Y | Y | Y | Y | | Y | | | | | |
| NSA | M5 | Y | Y | | | | | | Y (nsa) | | | | |
| NSA | M6 | | | Y | | | | Y | Y (nsa) | Y (nsa) | | | |
| NSA | M7 | Y | Y | Y | | | | | Y (nsa) | Y (nsa) | Y (nsa) | | |
| NSA | M8 | Y | Y | Y | Y | | | | Y (nsa) | Y (nsa) | | Y | Y (nsa) |
| SA | M9 | | | | Y | | | | Y | Y | | Y | Y |
| SA | M10 | | | Y | Y | Y | | | Y | Y | Y | Y | |
| SA | M11 | | Y | | | | | | Y | Y | Y | Y | |
| SA | M12 | | | | | | | | Y | | Y | | |
| SA | M13 | | | | | | | | | | | | |
| SA | M14 | | | | | | | | | Y | | Y | |
| SA | M15 | | | | | | | | | | | | |
| LDR | M16 | Y | Y | Y | Y | Y | | | Y | Y | | | |
| LDR | M17 | Y | Y | Y | Y | Y | | | Y | Y | | | |
| LDR | M18 | Y | Y | Y | Y | Y | | | Y | Y | | | |
| LDR | M19 | Y | Y | Y | Y | Y | | | Y | Y | | | |
| LDR | M20 | Y | Y | Y | Y | Y | | | Y | Y | | | |
| LDR | M25 | | | | | | | | | | | | |
| LDR | M26 | | | | | | | | | | | | |

INTELLIGENT METHOD AND SYSTEMS FOR AUTOMATED RADIO NETWORK PERFORMANCE EVALUATION OF A WIRELESS TELECOMMUNICATION NETWORK

BACKGROUND

In the radio access network (RAN) wireless testing industry, multiple elements including 4G, 5G, open radio access network (ORAN), radio hardware such as basebands, radio cards, remote radio heads, and antennas undergo periodic software and firmware upgrades and new feature releases. In conjunction, there are several vendors catering to end user equipment (UE) such as cell phones and fixed-wireless access equipment, which also undergo frequent software updates. Quality control, system interoperability, and complexities of testing pose huge challenges in trying to test every RAN-related software and hardware update with every device software.

BRIEF DESCRIPTION OF THE DRAWINGS

Detailed descriptions of implementations of the present invention will be described and explained through the use of the accompanying drawings.

FIG. 5 shows information stored in the second database.

FIG. 6 shows information stored in the third database.

Figure 1:
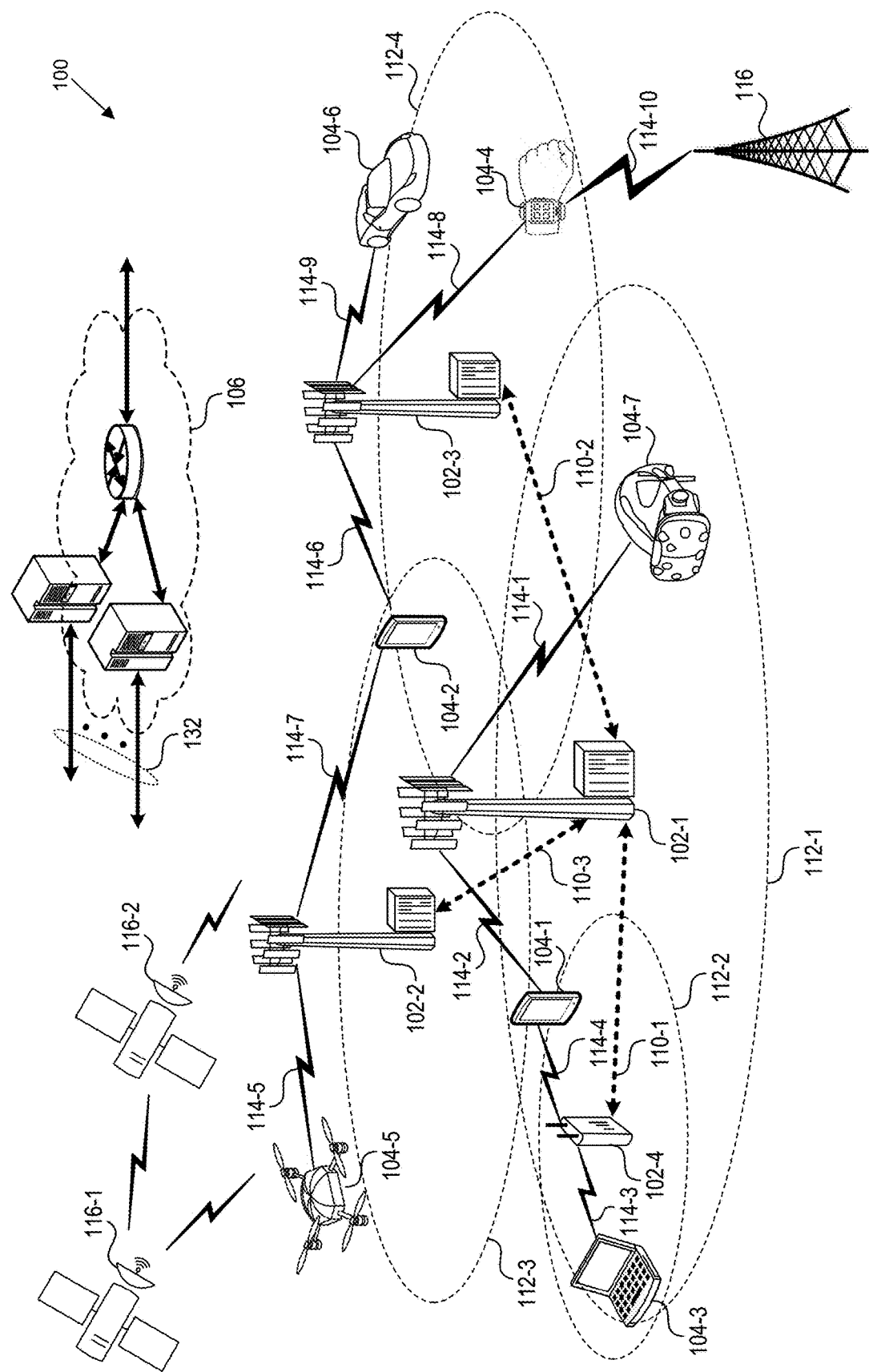
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system and method can test an update associated with a radio access network (RAN) of a wireless telecommunication network prior to deploying the update in production. The system periodically scans the RAN associated with the wireless telecommunication network to obtain an indication of a hardware status associated with the RAN and a software status associated with the RAN. The RAN includes a gNodeB, an eNodeB, and an open radio access network (ORAN). The system determines whether there is an update to the hardware or software status associated with the RAN.

Upon determining there is the update to the hardware or the software status, the system obtains from a database A an indication of a remote radio head configured to test the update. Based on the indication of the remote radio head, the system obtains from a database B multiple mobile devices configured to test the update. The system tests the update by causing the remote radio head to send a communication to a mobile device among the multiple mobile devices. The system obtains logs associated with the communication, where the logs are generated by a component of the wireless telecommunication network and the mobile device. Based on the logs, the system determines whether the update passes the test based on success and failure criteria stored in a database C.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QOS) requirements and multi-terabits-per-second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged RAN and core architecture to achieve Control and User Plane Separation (CUPS) and achieve extremely low user plane latency. In yet another example of 6G, the network 100 can implement a converged Wi-Fi and core architecture to increase and improve indoor coverage.

5G Core Network Functions

Figure 2:
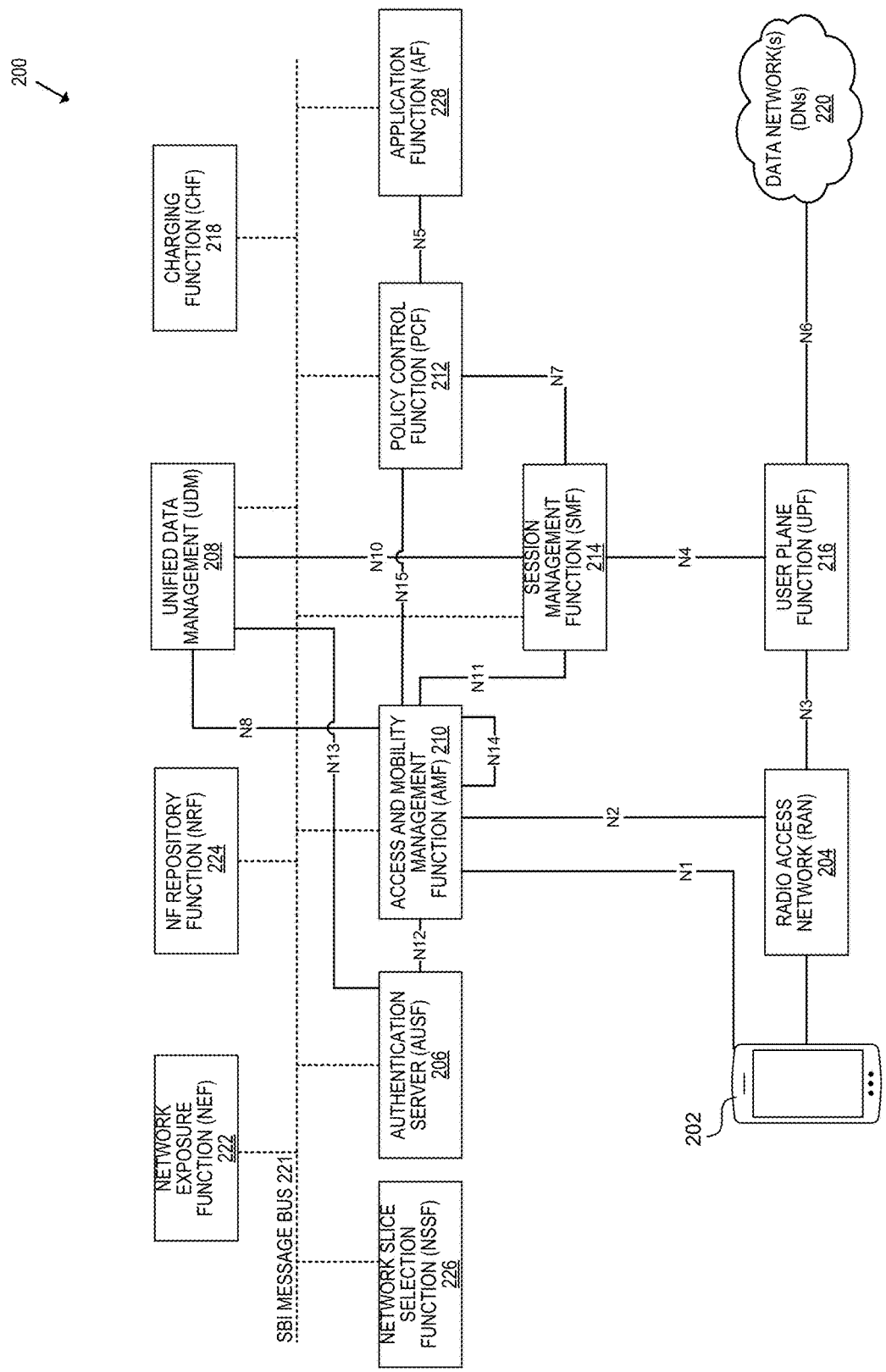
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Figure 3:
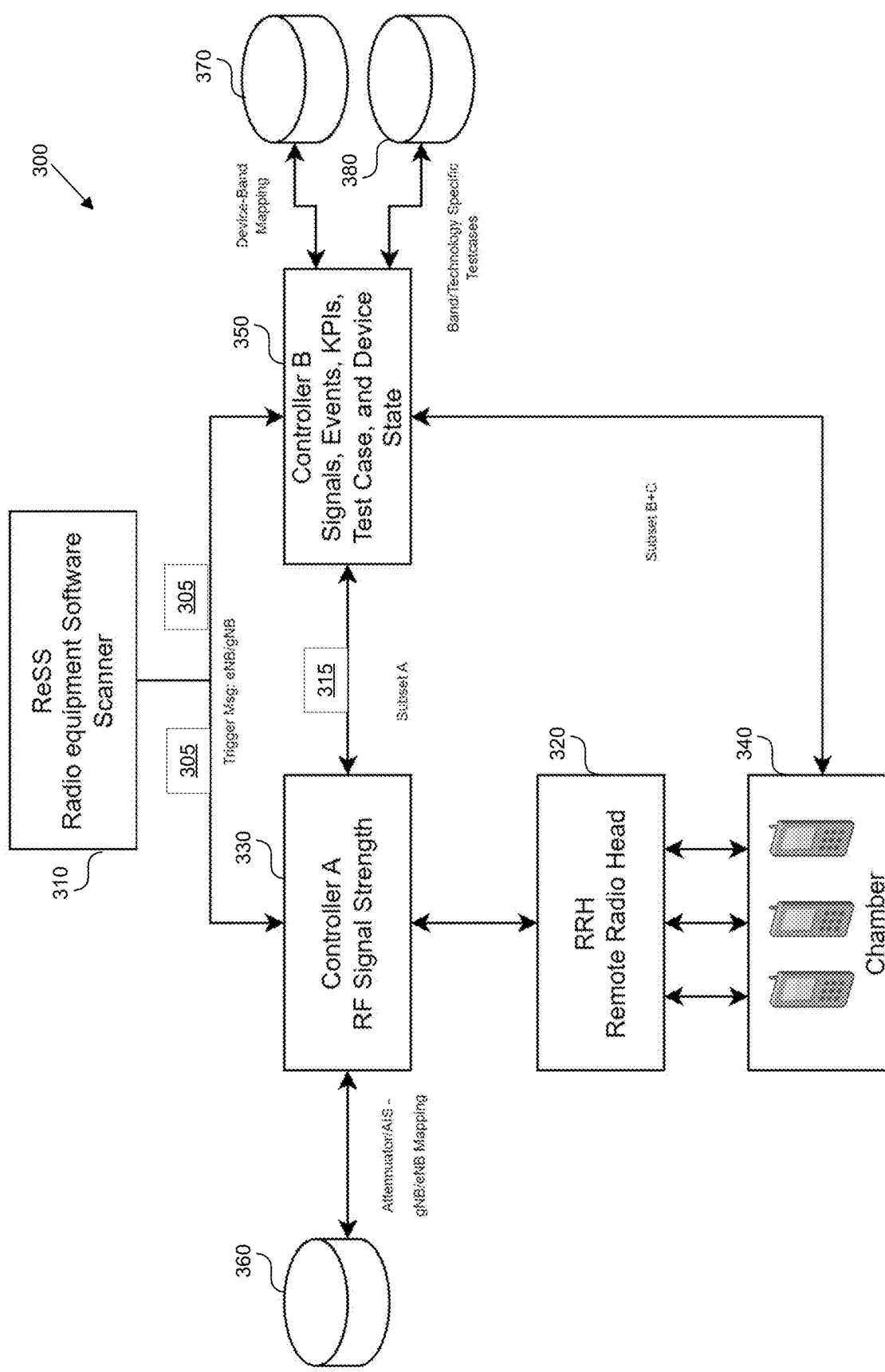
FIG. 3 shows a system to test an update associated with a radio access network (RAN) of a wireless telecommunication network.

An Intelligent Method and Systems for Automated Radio Network Performance Evaluation of a Wireless Telecommunication Network FIG. 3 shows a system to test an update associated with a RAN of a wireless telecommunication network. The system 300 can be a part of the network 100 in FIG. 1. The system 300 includes radio equipment software scanner (RESS) 310, remote radio head (RRH) 320, controller A 330, Shieldbox 340, controller B 350, and databases 360, 370, 380. The function of the RESS 310 is to periodically scan the RAN 204 in FIG. 2 and determine whether there has been a software or hardware upgrade associated with the RAN. If there is no update, the RESS 310 does not take any action. If there is an update, then the RESS 310 can trigger an action.

The RRH 320 includes a collection of multiple remote radio heads. Each RRH specifically broadcasts a different radio frequency (RF) bands and bandwidths to multiple UEs present within Sheildbox 340 and belongs to radio hardware whose control unit comprises a specific unique combination of network hardware. The RRH 320 provides RF signals to Sheildbox 340 containing multiple UEs of several vendor make and models. Each RRH can broadcast RF via 4 ports. If there are 16 radio heads, the RRH 320 can broadcast at 64 ports.

Controller A 330 can control the strength of the RF signals emitted by the RRH 320 via attenuators associated with the RRH 320.

Each UE among the multiple UEs in Sheildbox 340 is band-locked to specific frequency of interest, where even upon exposure to multiple RFs, the UE maintains the ability to communicate bidirectionally at a specific frequency associated with a particular generation of wireless technology such as 4G, 5G, 3G. Each UE can be locked to a combination of generation of wireless technology and/or RF bands. The multiple UEs, in addition to varying by generation of wireless technology and RF band, can vary by manufacturer, such as Apple, Samsung, Motorola, etc.

Controller B 350 knows the available UEs 340 that are in the chamber and can determine which of the multiple UEs to activate for testing. Controller B 350 can control, as well as record, signaling events and extrapolate key performance indices (KPI) messages from multiple UEs 340. Controller B 350 keeps the multiple UEs 340 in a "Radio-OFF" state by default unless a different state is required for testing. Controller B 350 can retrieve a predefined set of test cases detailing what actions the central controllers 330, 350 must take to execute the test and what properties the UE performing the test needs to have, such as the manufacturer, the generation of wireless technology, and the RF frequency of the UE.

Each central controller 330, 350 can communicate with the other central controllers using "trigger" messages configured to facilitate automation.

When in operation, the RESS 310 can initiate a software trigger when the RAN 204, including gNB/eNB/ORAN, undergoes an update. The software trigger periodically scans the current software and hardware version of the RAN 204, either by directly accessing the nodes of interest or querying a database present within the element management system of the radio vendors. When the RESS 310 detects a change in a specific node or in multiple nodes, the RESS triggers automation streams.

In addition, RESS 310 can trigger not only when there is a RAN element software change, but also when RESS detects a software change among the multiple UEs, in which case RESS triggers execution of testcases.

The automation streams may be triggered either by a CRON method with a set periodicity or via an external trigger from the RESS 310. The system 300 can utilize a central orchestration, or the controllers 330, 350 can receive a trigger message 305 causing them to perform a predetermined set of actions.

Controller A 330 can receive the trigger message 305 indicating the update, such as which RAN 204 hardware/software was upgraded. Controller A 330 can query the database 360 that can, based on the information about which RAN 204 hardware was updated, provide information on specific RF signals, specific attenuators, and respective RRH 320 ports that need to be tested. Controller A 330 can activate only those ports corresponding to gNB/eNB radios that were upgraded and can activate them at the predetermined level by controlling the attenuators.

Similarly, controller B 350, which controls the multiple UEs in Sheildbox 340, can await a trigger message 305 from the RESS 310 as well as a trigger message 315 from the controller A 330. Upon receiving the trigger messages 305, 315, controller B 350 proceeds to power up specific UEs among the multiple UEs in Sheildbox 340. Using the information in the trigger message 315, controller B 350 queries a second database 370. The second database 370 maps multiple UEs in Sheildbox 340 to RF bands. Based on the mapping, controller B 350 defines a first subset of devices. Furthermore, controller B 350 can utilize the trigger message 305 from the RESS 310 to determine a smaller, second subset of UEs from the first subset of UEs.

For example, based on the trigger message 315, controller B 350 can determine that the first subset of devices includes all devices with 5G n71, n25 and LTE B71, B2, B12. Upon interpreting the trigger message 305, controller B 350 can only select 5G technology and corresponding UEs with 5G n71 and n25.

Further, utilizing the trigger messages 305, 315, controller B 350 can query a third database 380 including test cases required to test specific band and specific generation wireless technology such as 5G, 4G, 3G, etc.

Using information obtained from the third database 380, controller B 350 can dynamically select a subset of test cases to run on every one of the devices in the second subset of devices, thereby reducing what could have been thousands of test cases to a manageable set.

Controller B 350 can collect the respective logs from the tested UEs and can parse them from a machine-readable format to a human-readable format. Controller B 350 can store the human-readable format in a database for quality evaluation and comparison against prior software.

The system 300 can implement a closed loop approach between the RESS 310, controller A 330, and controller B 350, where if any component of the system 300 fails and the system 300 cannot perform tests as triggers are received, the system 300 can store all received triggers. Further, the system 300 can periodically query status from every component 310, 320, 330, 340, 350, 360, 370, 380 until an "all ok" status is declared by each component. After receiving an indication that the system components are functioning again, the system 300 can retrieve the stored triggers and perform the tests initiated by the triggers.

Figure 4:
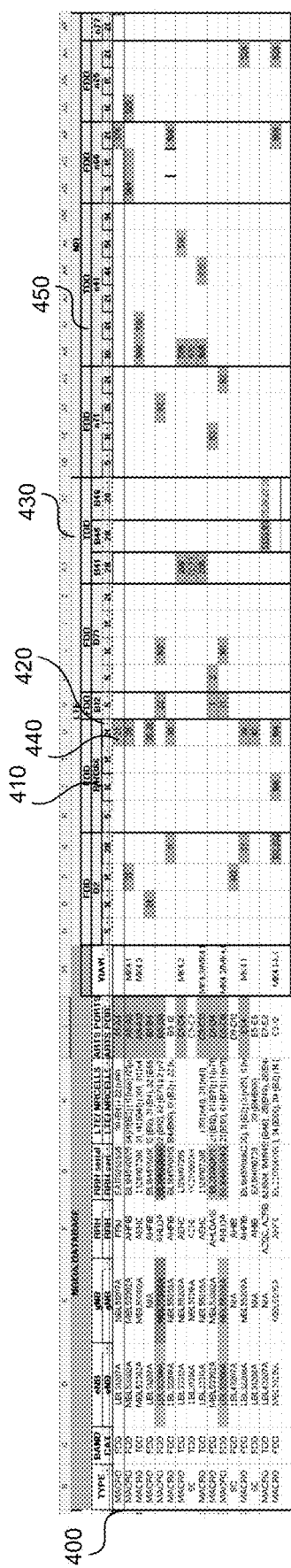
FIG. 4 shows information stored in the first database.

FIG. 4 shows information stored in the first database 360 in FIG. 3. The first database 360 communicates with and informs controller A 330 in FIG. 3. Each row 400 (only one labeled for brevity) indicates a signal that can be emitted by the RRH 320 in FIG. 3. Each RRH is broadcasting a particular frequency or a band, and the frequency is being broadcast at a certain bandwidth. For example, column 410 indicates that the signal is FDD in band B66. Further cells 420, 430 indicate that the signal is 20 megahertz in LTE technology, respectively. Cell 440 indicates a physical cell identifier (PCI) associated with the signal.

Column 450 indicates that the RRH in row 400 can emit a signal in the frequency band N66, which is the 5G equivalent of B66. In other words, the same RRH described in row 400 can broadcast in both LTE and 5G.

FIG. 5 shows information stored in the second database 370 in FIG. 3. The second database 370 communicates with and informs controller B 350 in FIG. 3. The second database 370 maps UEs to specific bands in which the UEs can communicate. Columns 500 refer to the LTE technology band locks. Columns 510 refer to the 5G technology band locks.

Rows 520 correspond to LTE UEs that have a specific set of LTE band locks on them. Rows 530 correspond to UEs that are the non-standalone devices which work on both LTE and 5G. Rows 540 correspond to UEs that are in 5G technology. UEs described by rows 542 and 544 are used for backup in case all LTE UEs or all 5G UEs fail. The UEs in rows 542, 544 can communicate in both LTE and 5G. Rows 550 correspond to UEs that can communicate only in 5G.

For example, if the remote radio head broadcasts band 71, the only UEs that can see the signal are devices M2, M4, M8, M9, and M10.

Figure 6:
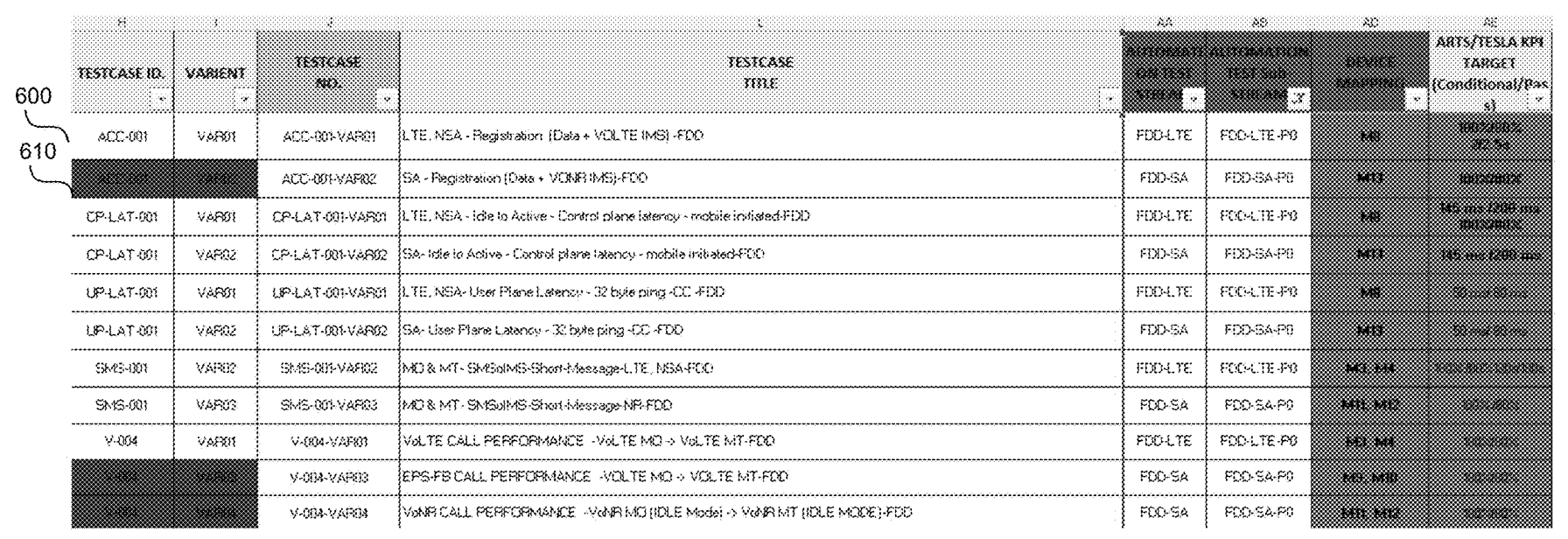

FIG. 6 shows information stored in the third database 380 in FIG. 3. The third database 380 communicates with and informs controller B 350 in FIG. 3. The third database 380 contains multiple test cases numbering over 2000 test cases. The third database 380 contains information about what bandwidth to test and information about what targets the test should meet in order to determine the success or failure of the test. For example, the third database 380 can get the indication of the band to test, such as N71, which matches to test cases 600, 610. Next, the third database 380 can get an indication to restrict the test cases to only 5G technology, which eliminates test case 600. In practice, the number of test cases can be reduced from thousands of cases to hundreds of cases by narrowing down based on various criteria such as band, bandwidth, generation of wireless technology, and/or manufacturer.

Figure 7:
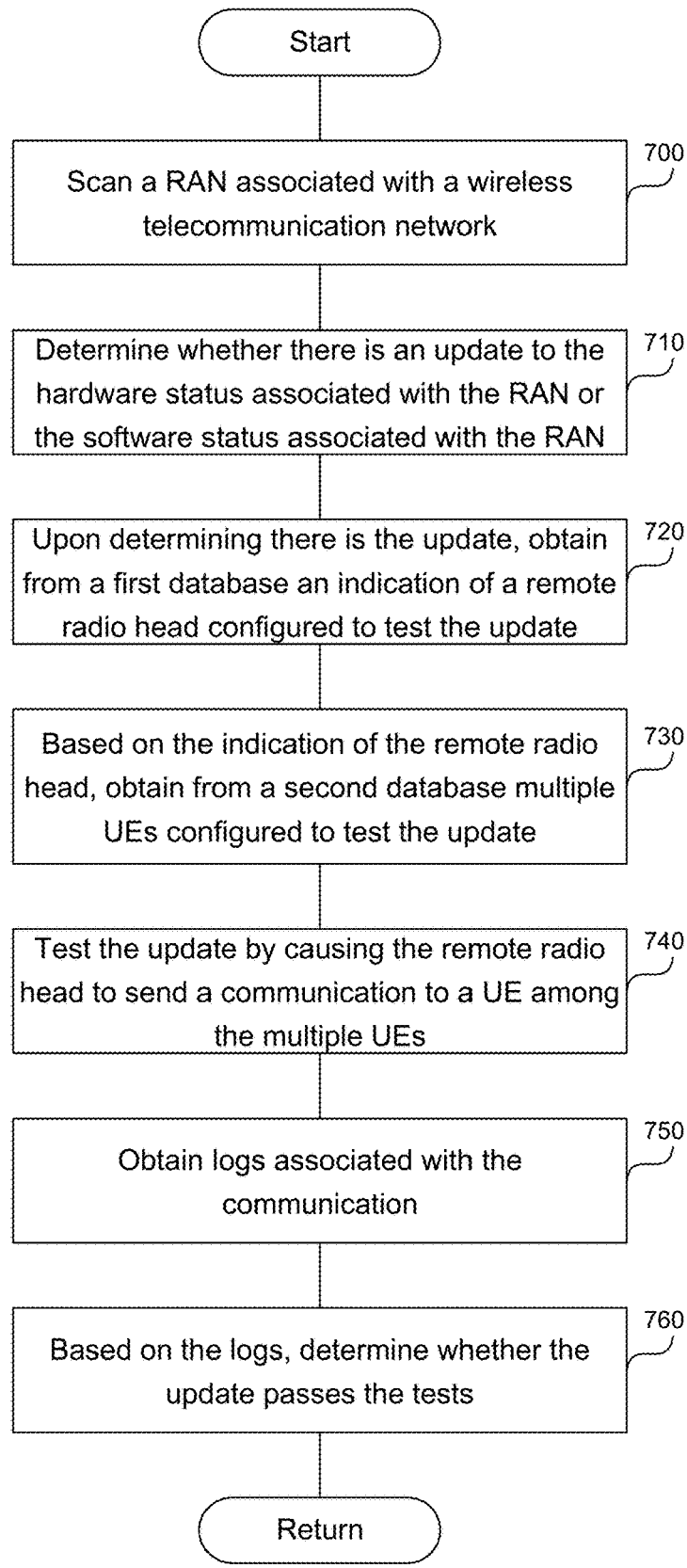
FIG. 7 shows a flowchart of a method to test an update associated with a RAN.

FIG. 7 shows a flowchart of a method to test an update associated with a RAN. In step 700, a hardware or software processor executing instructions described in this application can periodically scan a RAN associated with a wireless telecommunication network to obtain an indication of a hardware status associated with the RAN and a software status associated with the RAN. The RAN includes a gNodeB, an eNodeB, and an ORAN. To obtain the indication of the hardware and software status, the processor can directly access the node associated with the RAN, or query a database associated with the RAN.

In step 710, the processor can determine whether there is an update to the hardware status associated with the RAN or the software status associated with the RAN.

In step 720, upon determining there is the update to the hardware status associated with the RAN or the software status associated with the RAN, the processor can obtain from a first database an indication of a remote radio head configured to test the update.

In step 730, based on the indication of the remote radio head, the processor can obtain from a second database multiple UEs configured to test the update.

In step 740, the processor can test the update by causing the remote radio head to send a communication to a UE among the multiple UEs.

In step 750, the processor can obtain logs associated with the communication, where the logs are generated by a component of the wireless telecommunication network and the UE among the multiple UEs. The processor can translate the logs from a machine-readable format to a human-readable format and store the human-readable format for inspection.

In step 760, based on the logs, the processor can determine whether the update passes the tests. Success and failure criteria can be stored in a third database, which can aid the processor in making the determination.

The processor can reduce the number of the multiple UEs used in the test. Based on the update, the processor can determine a first subset of UEs among the multiple UEs configured to test the update. For example, the updates can include generation of wireless technology, such as 5G, 4G, 3G, RF band, and/or manufacturer of the UE to use in the test. Based on the update, the processor can obtain from a third database multiple test cases associated with the RAN, where the multiple test cases are configured to test the update and where the multiple test cases include a band, a generation of wireless technology, and/or a manufacturer of the UE. Based on the multiple test cases and the first subset of devices, the processor can determine a subset of the multiple test cases to run, thereby reducing a number of test cases to run from several thousand to several hundred tests.

The processor can determine that a component of the wireless telecommunication network has failed, where the failure prevents testing of the update. The processor can store an indication of the update for testing when the failure is resolved.

The processor can, based on the update, determine a subset of UEs among the multiple UEs configured to test the update.

The processor can obtain a first indication to test the multiple UEs, where the first indication includes a generation of technology and a band. The processor can obtain a second indication to test the multiple UEs, where the second indication includes the generation of technology. Based on the first indication and the second indication, the processor can select the multiple UEs, where a number of the selected multiple UEs is less than a number of multiple UEs selected based on only the first indication or only the second indication.

Computer System

Figure 8:
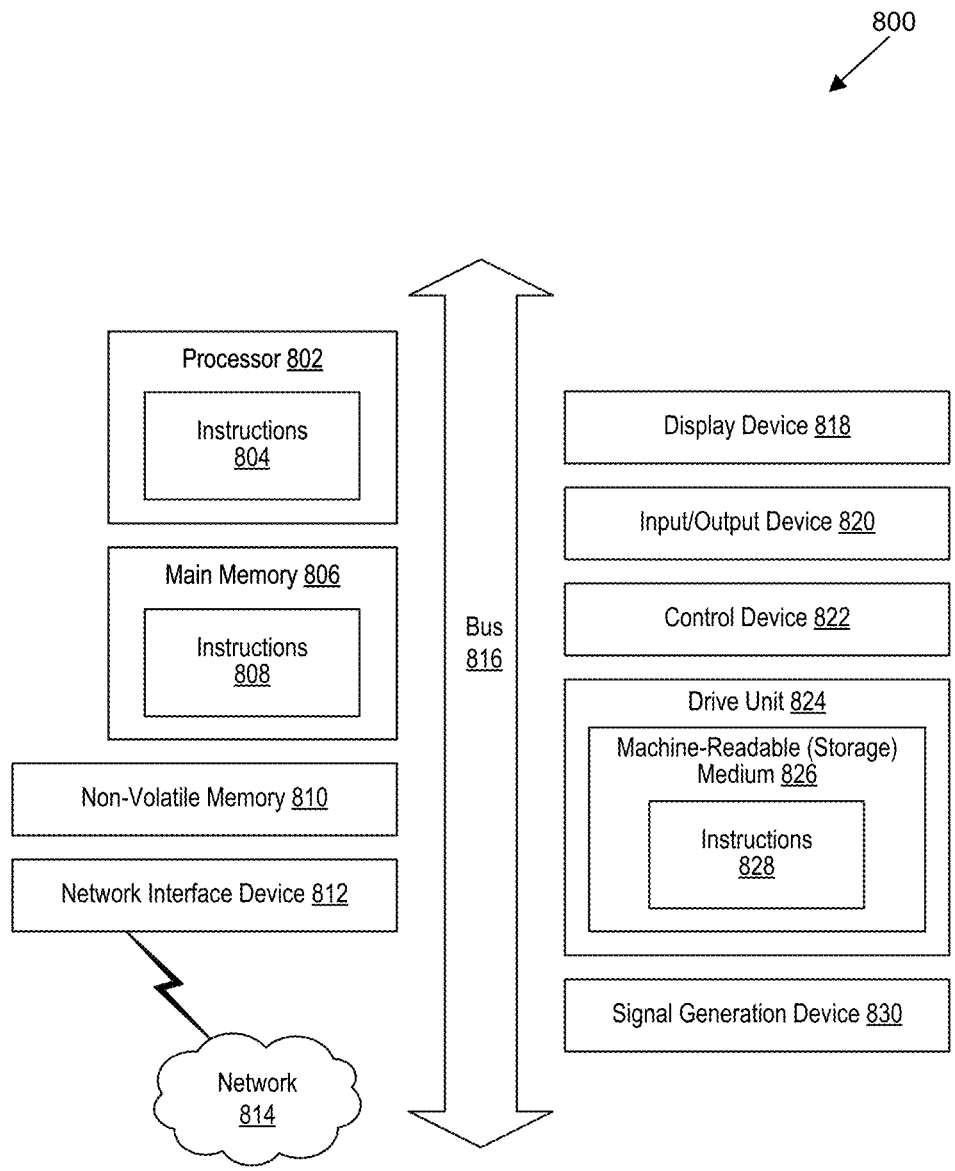
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementations, the computer system 800 can be an embedded computer system, a system-on-chip (SOC), a single-board computer system (SBC), or a distributed system such as a mesh of computer systems, or can include one or more cloud components in one or more networks. Where appropriate, one or more computer systems 800 can perform operations in real time, in near real time, or in batch mode.

The network interface device 812 enables the computer system 800 to mediate data in a network 814 with an entity that is external to the computer system 800 through any communication protocol supported by the computer system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computer system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one non-transitory computer-readable storage medium storing instructions to test an update associated with a radio access network (RAN) of a wireless telecommunication network, which, when executed by at least one data processor of a system, cause the system to:
    periodically scan the RAN of the wireless telecommunication network to obtain an indication of a hardware status associated with the RAN and a software status associated with the RAN,
        wherein the RAN includes a gNodeB, an eNodeB, and an open radio access network (ORAN);
    determine whether there is the update to the hardware status associated with the RAN or the software status associated with the RAN;
    upon determining there is the update to the hardware status associated with the RAN or the software status associated with the RAN, obtain from a first database an indication of a remote radio head configured to test the update;
    based on the indication of the remote radio head, obtain from a second database multiple mobile devices configured to test the update;
    test the update by causing the remote radio head to send a communication to a mobile device among the multiple mobile devices;
    obtain logs associated with the communication,
        wherein the logs are generated by a component of the wireless telecommunication network and the mobile device among the multiple mobile devices; and
    based on the logs, determine whether the update passes the test.

2. The at least one non-transitory computer-readable storage medium of claim 1, comprising instructions to:
    based on the update, determine a first subset of mobile devices among the multiple mobile devices configured to test the update;
    based on the update, obtain from a third database multiple test cases associated with the RAN,
        wherein the multiple test cases are configured to test the update,
        wherein the multiple test cases include a band and a generation of wireless technology; and
    based on the multiple test cases and the first subset of mobile devices, select a subset of the multiple test cases to run, thereby reducing a number of test cases to run.

3. The at least one non-transitory computer-readable storage medium of claim 1, comprising instructions to:
    translate the logs from a machine-readable format to a human-readable format; and
    store the human-readable format.

4. The at least one non-transitory computer-readable storage medium of claim 1, wherein the instructions to periodically scan the RAN comprise instructions to:
    directly access a node associated with the RAN; or
    query a database associated with the RAN.

5. The at least one non-transitory computer-readable storage medium of claim 1, comprising instructions to:
    determine that a component of the wireless telecommunication network has failed, wherein the failure prevents testing of the update; and
    store an indication of the update for testing when the failure is resolved.

6. The at least one non-transitory computer-readable storage medium of claim 1, comprising instructions to:
    based on the update, determine a subset of mobile devices among the multiple mobile devices configured to test the update.

7. The at least one non-transitory computer-readable storage medium of claim 1, comprising instructions to:
    obtain a first indication to test the multiple mobile devices, wherein the first indication includes a generation of wireless technology and a band;
    obtain a second indication to test the multiple mobile devices, wherein the second indication includes the generation of wireless technology; and
    based on the first indication and the second indication, select the multiple mobile devices, wherein a number of the selected multiple mobile devices is less than a number of multiple mobile devices selected based on only the first indication or only the second indication.

8. A method comprising:
    scanning a RAN associated with a wireless telecommunication network to obtain an indication of a hardware status associated with the RAN and a software status associated with the RAN,
        wherein the RAN includes a gNodeB, an eNodeB, and an open radio access network (ORAN);
    determining whether there is an update to the hardware status associated with the RAN or the software status associated with the RAN;
    upon determining there is the update to the hardware status associated with the RAN or the software status associated with the RAN, obtaining from a first database an indication of a remote radio head configured to test the update;
    based on the indication of the remote radio head, obtaining from a second database multiple user equipment (UEs) configured to test the update;

testing the update by causing the remote radio head to send a communication to a UE among the multiple UEs;
obtaining logs associated with the communication,
wherein the logs are generated by a component of the wireless telecommunication network and the UE among the multiple UEs; and
based on the logs, determining whether the update passes the test.

9. The method of claim 8, comprising:
based on the update, determining a first subset of UEs among the multiple UEs configured to test the update;
based on the update, obtaining from a third database multiple test cases associated with the RAN,
wherein the multiple test cases are configured to test the update,
wherein the multiple test cases include a band and a generation of wireless technology; and
based on the multiple test cases and the first subset of UEs, determining a subset of the multiple test cases to run, thereby reducing a number of test cases to run.

10. The method of claim 8, comprising:
translating the logs from a machine-readable format to a human-readable format; and
storing the human-readable format.

11. The method of claim 8, wherein scanning the RAN comprises:
directly accessing a node associated with the RAN; or
querying a database associated with the RAN.

12. The method of claim 8, comprising:
determining that a component of the wireless telecommunication network has failed, wherein the failure prevents testing of the update; and
storing an indication of the update for testing when the failure is resolved.

13. The method of claim 8, comprising:
based on the update, determining a subset of UEs among the multiple UEs configured to test the update.

14. The method of claim 8, comprising:
obtaining a first indication to test the multiple UEs, wherein the first indication includes a generation of wireless technology and a band;
obtaining a second indication to test the multiple UEs, wherein the second indication includes the generation of wireless technology; and
based on the first indication and the second indication, selecting the multiple UEs, wherein a number of the selected multiple UEs is less than a number of multiple UEs selected based on only the first indication or only the second indication.

15. A system comprising:
a radio equipment software scanner configured to initiate a software trigger,
wherein the software trigger is configured to periodically scan a hardware state and a software state associated with a RAN of a wireless telecommunication network;
a first controller configured to:
receive a trigger indicating a radio associated with the RAN is updated,
query a first database to obtain an indication of a remote radio head configured to test an update,
wherein the remote radio head is configured to operate at a particular frequency band and a particular generation of wireless technology;
multiple UEs configured to operate at multiple frequency bands, associated with multiple generations of wireless technology, and manufactured by multiple manufacturers; and
a second controller configured to:
control the multiple UEs,
await a first trigger message from the radio equipment software scanner and a second trigger message from the first controller, and
upon receiving the first trigger message and the second trigger message, select a subset of the multiple UEs.

16. The system of claim 15, the second controller configured to:
based on the second trigger message, query a second database mapping a UE among the multiple UEs to a frequency band to determine a first subset of the multiple UEs;
based on the first trigger message, determine a second subset of multiple devices from the first subset of multiple devices, wherein the second subset of multiple devices is smaller than the first subset of multiple devices;
based on the first trigger message and the second trigger message, query a third database including multiple test cases to obtain a test case configured to test the update; and
based on the multiple test cases and the second subset of multiple devices, determine a subset of test cases among the multiple test cases to run, thereby reducing a number of test cases to run.

17. The system of claim 15, the second controller configured to:
collect logs from the multiple UEs;
translate the logs from a machine-readable format to a human-readable format; and
store the human-readable format in a database.

18. The system of claim 15, comprising the software trigger configured to periodically scan the RAN by directly accessing a node associated with the RAN or by querying a database associated with the RAN.

19. The system of claim 15, the radio equipment software scanner configured to trigger an automation stream upon detecting a change associated with the hardware state or the software state associated with the RAN,
wherein the automation stream is configured to be triggered by a CRON method with a set periodicity or by an external trigger from the radio equipment software scanner.

20. The system of claim 15, the second controller configured to:
based on the second trigger message, query a second database mapping a UE among the multiple UEs to a frequency band to determine a first subset of the multiple UEs; and
based on the first trigger message, determine a second subset of multiple devices from the first subset of multiple devices, wherein the second subset of multiple devices is smaller than the first subset of multiple devices.

* * * * *